(12) United States Patent
Kawaguchi et al.

(10) Patent No.: US 11,784,019 B2
(45) Date of Patent: Oct. 10, 2023

(54) ELECTROMAGNETIC RELAY WITH MAGNETIC ARC EXTENSION

(71) Applicant: OMRON Corporation, Kyoto (JP)

(72) Inventors: Naoki Kawaguchi, Kyoto (JP); Ryota Minowa, Kyoto (JP); Kohei Otsuka, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/520,717

(22) Filed: Nov. 8, 2021

(65) Prior Publication Data

US 2022/0165527 A1 May 26, 2022

(30) Foreign Application Priority Data

Nov. 20, 2020 (JP) .................................. 2020-193790

(51) Int. Cl.
*H01H 50/60* (2006.01)
*H01H 50/02* (2006.01)
(Continued)

(52) U.S. Cl.
CPC ............ *H01H 50/60* (2013.01); *H01H 50/02* (2013.01); *H01H 50/58* (2013.01); *H01H 50/64* (2013.01);
(Continued)

(58) Field of Classification Search
CPC ........ H01H 50/60; H01H 50/02; H01H 50/58; H01H 50/64; H01H 50/36;
(Continued)

(56) References Cited

U.S. PATENT DOCUMENTS 6,700,466 B1 * 3/2004 Yamamoto ............. H01H 9/302
335/201
11,158,474 B2 * 10/2021 Ikushima ............... H01H 50/54
(Continued)

FOREIGN PATENT DOCUMENTS

| JP | 2016-039035 A | 3/2016 |
|---|---|---|
| JP | 6365684 B2 | 8/2018 |
| KR | 10-2012-0135861 A | 12/2012 |

OTHER PUBLICATIONS

The Office Action for the corresponding Korean application No. 10-2021-0142372 dated Jul. 7, 2023.

*Primary Examiner* — Bernard Rojas
(74) *Attorney, Agent, or Firm* — SHINJYU GLOBAL IP

(57) ABSTRACT

An electromagnetic relay includes a base, a case, an arc extension space, a contact device, and a magnet. The contact device includes a fixed terminal, a fixed contact, a movable contact piece, a movable contact. The magnet includes a first magnet portion facing the contact device, and a second magnet portion disposed adjacent to the first magnet portion and facing the arc extension space. The magnet generates a magnetic field to extend an arc generated between the fixed contact and the movable contact. The base is separated from a midpoint of a straight line between the fixed contact and the movable contact by a distance different from a distance between the base and a center of the arc extension space. The base is separated from a center of the first magnet portion by a distance different from a distance between the base and a center of the second magnet portion.

20 Claims, 12 Drawing Sheets

(51) Int. Cl.
*H01H 50/58* (2006.01)
*H01H 50/64* (2006.01)
*H01H 50/36* (2006.01)

(52) U.S. Cl.
CPC ....... *H01H 50/36* (2013.01); *H01H 2205/002* (2013.01)

(58) Field of Classification Search
CPC .... H01H 2205/002; H01H 1/20; H01H 50/38; H01H 50/16; H01H 50/54; Y02E 10/50
See application file for complete search history.

(56) References Cited

U.S. PATENT DOCUMENTS

| | | | |
|---|---|---|---|
| 2010/0060394 A1* | 3/2010 | Nagura | H01H 9/443 335/189 |
| 2012/0313737 A1* | 12/2012 | Iwamoto | H01H 50/56 335/185 |
| 2017/0162353 A1 | 6/2017 | Kubono | |
| 2017/0301494 A1 | 10/2017 | Itoda et al. | |
| 2017/0301496 A1 | 10/2017 | Hayashida et al. | |
| 2019/0096616 A1 | 3/2019 | Itoda et al. | |

\* cited by examiner

ELECTROMAGNETIC RELAY WITH MAGNETIC ARC EXTENSION

This application claims priority to Japanese Patent Application No. 2020-193790, filed Nov. 20, 2020. The contents of that application are incorporated by reference herein in their entirety.

FIELD

The present invention relates to a control device and a solar power generation system.

BACKGROUND

An electromagnetic relay has been known which includes an arc extension space for extending an arc that is generated when a contact in the relay is opened and closed, and a permanent magnet for generating a magnetic field to guide the arc to the arc extension space (see Japanese Patent No. 6365864).

SUMMARY

In a conventional electromagnetic relay, a permanent magnet is used to generate a magnetic field such that an arc is guided into the arc extension space, where a magnetic flux flows in a direction where the permanent magnet is involved. Thus, the direction of arc extension is difficult to control, and there is room for improvement in order to use the arc extension space more effectively. Further, in a case where a contact unit including a fixed contact and a movable contact is disposed apart from the center of a permanent magnet, if the permanent magnet which is rectangular in shape is disposed facing the contact unit and an arc extension space, the magnetic flux near the contact unit flows in the direction where the permanent magnet is involved. Accordingly, it is difficult to control the extension direction of the arc as intended.

An object of the present invention is to facilitate controlling of the extension direction of an arc in an electromagnetic relay.

An electromagnetic relay according to one aspect of the present invention includes a housing, an arc extension space, a contact device, and a magnet. The housing includes a base and a case attached to the base. The arc extension space is formed between the base and the case. The contact device includes a fixed terminal supported by the base, a fixed contact connected to the fixed terminal, a movable contact piece, and a movable contact connected to the movable contact piece and facing the fixed contact. The magnet is configured to generate a magnetic field to extend an arc generated between the fixed contact and the movable contact in the arc extension space. The magnet includes a first magnet portion facing the contact device and a second magnet portion disposed adjacent to the first magnet portion and facing the arc extension space. The base is separated from a midpoint of a straight line between the fixed contact and the movable contact by a distance different from a distance between the base and a center of the arc extension space. The base is separated from a center of the first magnet portion by a distance different from a distance between the base and a center of the second magnet portion.

The electromagnetic relay has a configuration in which the distance from the midpoint of the straight line between the fixed contact and the movable contact to the base is different from the distance from the center of the arc extension space to the base. In the configuration, the distance between the center of the first magnet portion and the base is also different from the distance between the center of the second magnet portion and the base. This configuration allows, for example, the first magnet portion to be disposed such that the center of the first magnet portion is located near the midpoint of the straight line between the fixed contact and the movable contact and allows the second magnet portion to be disposed such that the center of the second magnet portion is located near the center of the arc extension space. Thus, the magnetic flux of the first magnet portion is to flow, near the contact, in a direction substantially parallel to the direction where the first magnet portion and the contact device overlap. Further, near the center of the arc extension space, the magnetic flux is to flow in a direction substantially parallel to the direction where the second magnet portion and the arc extension space overlap. As such, the direction of the arc extension can be controlled easier than in the case where the magnetic flux acting on the arc is involved with the permanent magnet. As a result, the arc can be easily guided to the arc extension space, and the arc can be effectively extended in the arc extension space.

The midpoint of the straight line between the fixed contact and the movable contact may be closer to the base than the center of the arc extension space. The center of the first magnet portion may be closer to the base than the center of the second magnet portion. In this case, since the center of the first magnet portion is located near the midpoint of the straight line between the fixed contact and the movable contact, the arc can be more easily guided into the arc extension space.

The center of the arc extension space may be farther from the base than the fixed terminal. In this case, the arc can be extended more effectively in the arc extension space.

The magnet may further include, as viewed from the direction in which the contact device and the first magnet portion overlap, a straight portion extending parallel to the base and an inclined portion. The inclined portion may be disposed apart from the straight portion and may incline in a direction away from the base as the inclined portion approaches the arc extension space from the contact device. In this case, the simple configuration can differentiate the distance between the center of the first magnet portion and the base from the distance between the center of the second magnet portion and the base.

The magnet may be inclined relative to the base as viewed from the direction in which the contact device and the first magnet portion overlap. In this case, the simple configuration differentiates the distance between the center of the first magnet portion and the base from the distance between the center of the second magnet portion and the base.

The magnet may be polygonal in shape as viewed from the direction in which the contact device overlaps with the first magnet portion.

The first magnet portion may be a separate body from the second magnet portion. In this case, the degree of freedom in design increases.

The second magnet portion may have an area greater than the first magnet portion as viewed from the direction in which the contact device and the first magnet portion overlap. In this case, the arc can be extended more effectively in the arc extension space.

The center of the first magnet portion may be the center of gravity of the first magnet portion, or the center of a cross section of the first magnet portion cut along a plane crossing the midpoint and parallel to a first direction orthogonal to the base and a second direction in which the contact device and the first magnet portion overlap. The center of the second magnet portion may be the center of the second magnet portion is the center of gravity of the second magnet portion, or the center of a cross section of the second magnet portion cut along a plane crossing the center of the arc extension space and parallel to the first and second directions. In this case, the direction of the arc extension can be controlled easily.

The second magnet portion may have a dimension in the first direction orthogonal to the base that is greater than a dimension of the first magnet portion in the first direction. In this case, the arc can be extended more effectively in the arc extension space.

The magnet may be a plastic magnet. In this case, the degree of freedom in design increases.

DETAILED DESCRIPTION

Figure 1:
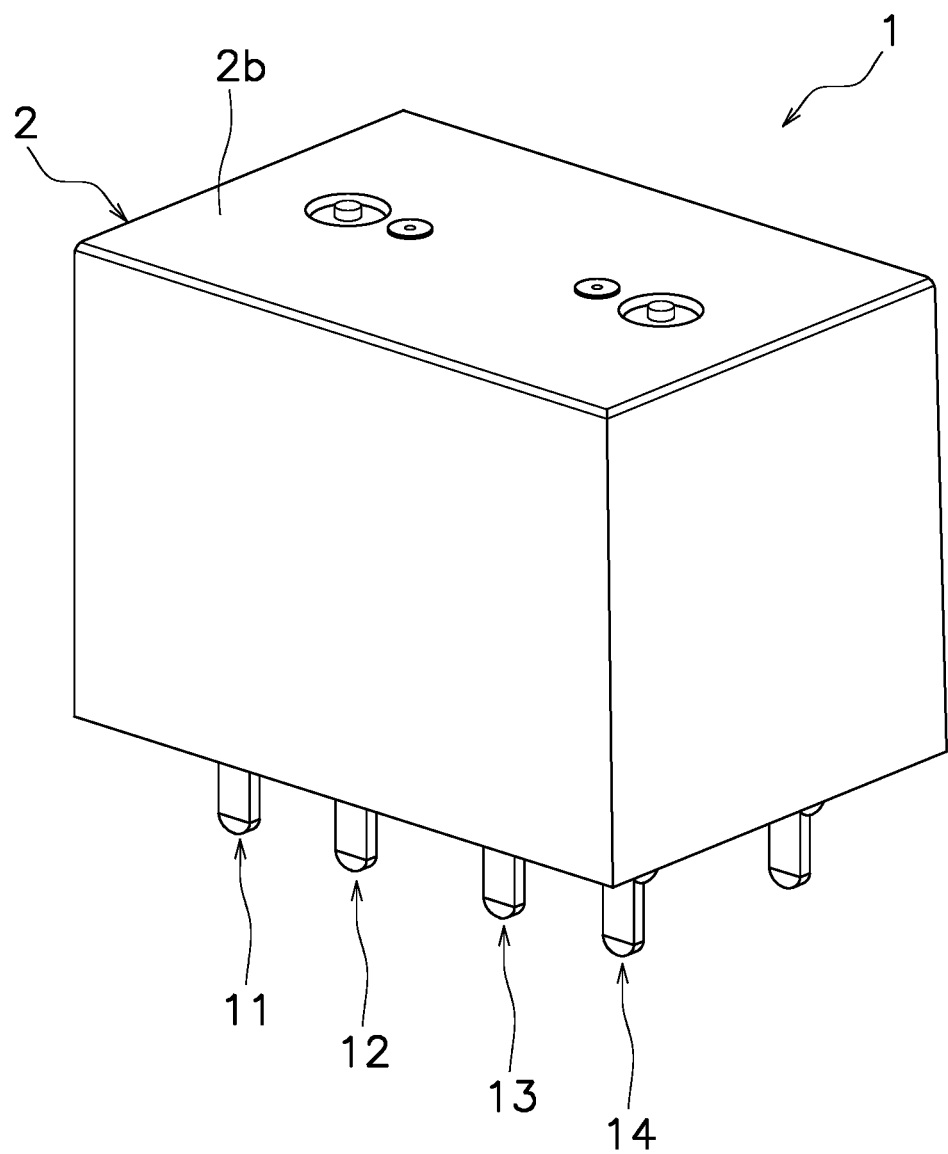
FIG. 1 is a perspective view of an electromagnetic relay.
Figure 2:
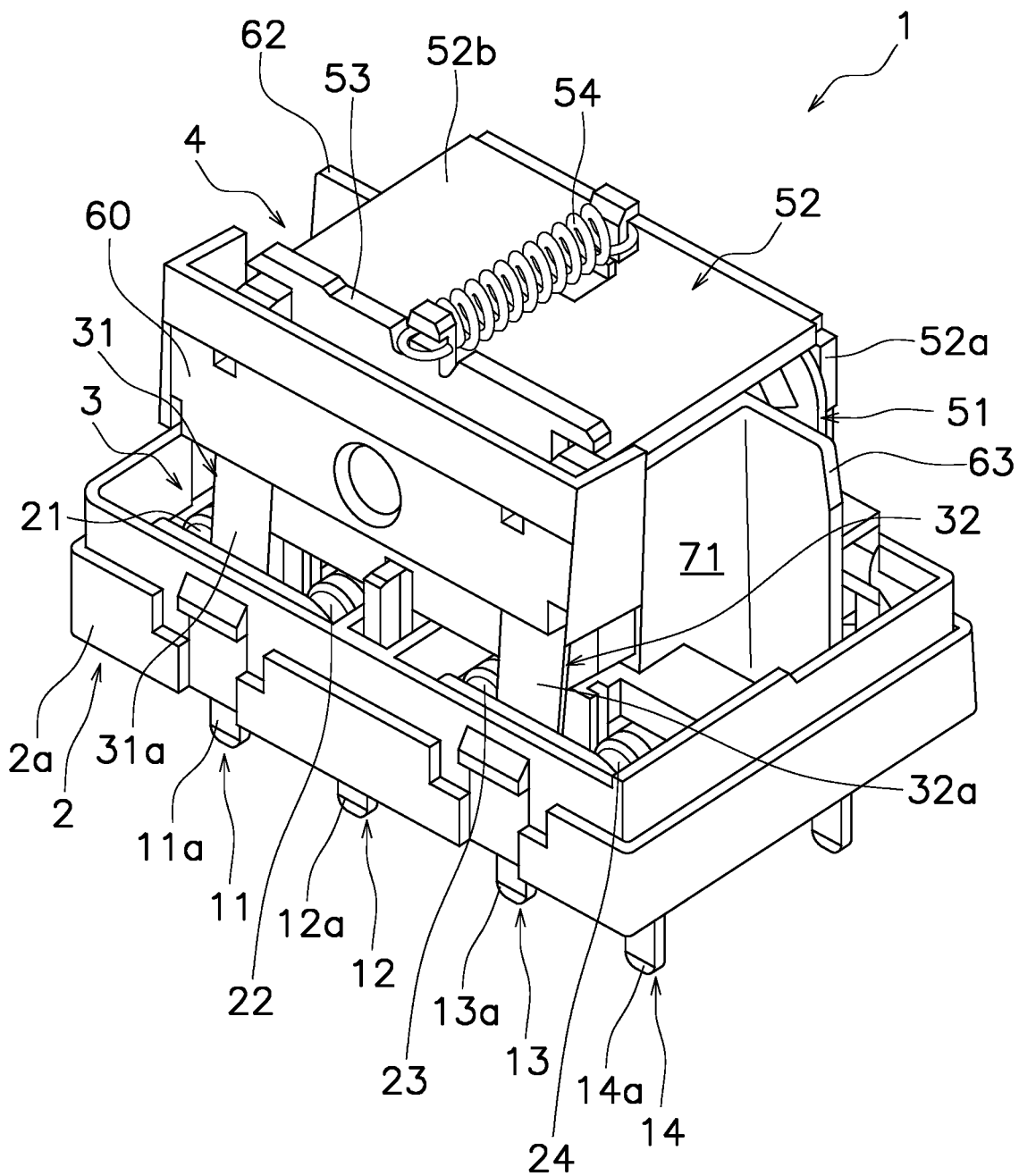
FIG. 2 is a perspective view of an electromagnetic relay with the cover removed.

Hereinafter, an electromagnetic relay 1 according to an embodiment will be described with reference to the drawings. As shown in FIGS. 1 and 2, the electromagnetic relay 1 includes a housing 2, a contact device 3, and a drive device 4.

In the following description, the direction in which the contact device 3 and the drive device 4 are disposed with respect to a later-described base 2a of the housing 2 is referred to as up, and the opposite direction is referred to as down. The direction in which the contact device 3 is disposed with respect to the drive device 4 is referred to as front, and the opposite is referred to as rear. The direction which intersects with the up-down direction and the front-rear direction is referred to as left-right direction: the up-down direction is one example of a first direction while the left-right direction is one example of a second direction. However, these directions are defined only for convenience of description, and do not limit the arrangement directions of the electromagnetic relay 1.

The housing 2 has a box shape. The housing 2 includes a base 2a and a case 2b. The base 2a supports the contact device 3 and the drive device 4. The case 2b is open downward and is attached to the base 2a so as to cover the base 2a from above. The contact device 3 and the drive device 4 are accommodated in the housing 2.

Figure 3:
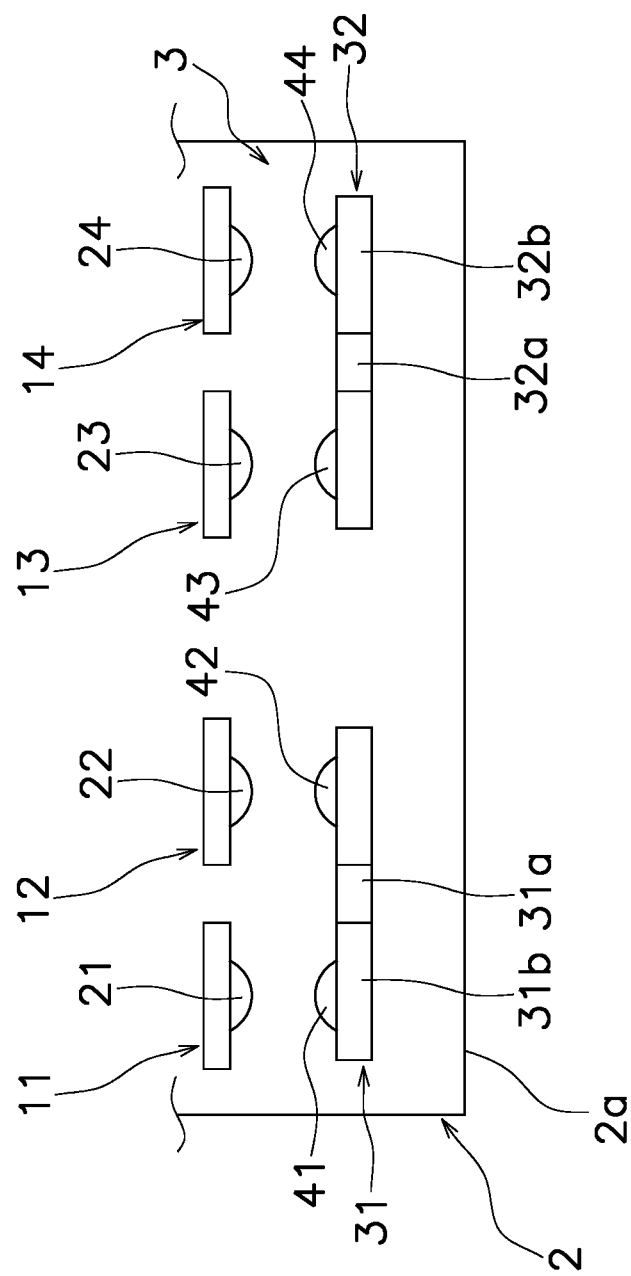
FIG. 3 is a schematic view of a contact device as viewed from above.

FIG. 3 is a schematic view of the contact device 3 as viewed from above the base 2a with the case 2b of the housing 2 omitted. The contact device 3 includes a first fixed terminal 11, a second fixed terminal 12, a third fixed terminal 13, a fourth fixed terminal 14, a first fixed contact 21, a second fixed contact 22, a third fixed contact 23, a fourth fixed contact 24, a first movable contact piece 31, a second movable contact piece 32, a first movable contact 41, a second movable contact 42, a third movable contact 43, and a fourth movable contact 44. In the following description, the first movable contact piece 31 and the second movable contact piece 32 may be referred to as movable contact pieces 31 and 32.

The first to fourth fixed terminals 11 to 14 are made of conductive material such as copper. The first to fourth fixed terminals 11 to 14 are plate-shaped terminals and extend in the up-down direction. The first to fourth fixed terminals 11 to 14 are supported by the base 2a. The first to fourth fixed terminals 11 to 14 are disposed apart from each other in the left-right direction. In the present embodiment, the first fixed terminal 11, the second fixed terminal 12, the third fixed terminal 13, and the fourth fixed terminal 14 are disposed in this order from the left side to the right side in the base 2a. The first to fourth fixed terminals 11 to 14 respectively include an external connection portion 11a to 14a protruding downward from the base 2a. The external connection portions 11a to 14a protrude downward from the base 2a so as to be electrically connected to external devices (not shown).

The first fixed contact 21 is connected to the first fixed terminal 11. The first fixed contact 21 is disposed on the front side of the first fixed terminal 11. The second fixed contact 22 is connected to the second fixed terminal 12. The second fixed contact 22 is disposed on the front side of the second fixed terminal 12. The third fixed contact 23 is connected to the third fixed terminal 13. The third fixed contact 23 is disposed on the front side of the third fixed terminal 13. The fourth fixed contact 24 is connected to the fourth fixed terminal 14. The fourth fixed contact 24 is disposed on the front side of the fourth fixed terminal 14.

The first movable contact piece 31 and the second movable contact piece 32 are plate-shaped terminals and are made of conductive material such as copper. The first movable contact piece 31 is disposed in front of the first fixed terminal 11 and the second fixed terminal 12. The first movable contact piece 31 has a substantially T-shape as viewed from the front-rear direction and includes an up-down extending portion 31a and a left-right extending portion 31b. The up-down extending portion 31a extends in the up-down direction and is, at the top, connected to the drive device 4. The left-right extending portion 31b extends from the bottom of the up-down extending portion 31a in the left-right direction.

The second movable contact piece 32 is disposed apart from the first movable contact piece 31 in the left-right direction. In the present embodiment, the second movable contact piece 32 is disposed to the right of the first movable contact piece 31. The second movable contact piece 32 is disposed in front of the third fixed terminal 13 and the fourth fixed terminal 14. The second movable contact piece 32 has the same shape as the first movable contact piece 31. The second movable contact piece 32 includes an up-down extending portion 32a and a left-right extending portion 32b.

The first to fourth movable contacts 41 to 44 are made of conductive material such as copper. The first movable contact 41 and the second movable contact 42 are connected to the first movable contact piece 31. The first movable contact 41 and the second movable contact 42 are disposed on the left-right extending portions 31b.

The first movable contact 41 faces the first fixed contact 21 in the front-rear direction. The first movable contact 41 is contactable with the first fixed contact 21. The second movable contact 42 is disposed apart from the first movable contact 41 in the left-right direction. The second movable contact 42 faces the second fixed contact 22 in the front-rear direction. The second movable contact 42 is contactable with the second fixed contact 22.

The third movable contact 43 and the fourth movable contact 44 are connected to the second movable contact piece 32. The third movable contact 43 and the fourth movable contact 44 are disposed on the left-right extending portion 32b. The third movable contact 43 faces the third fixed contact 23 in the front-rear direction. The third movable contact 43 is contactable with the third fixed contact 23. The fourth movable contact 44 is disposed apart from the third movable contact 43 in the left-right direction. The fourth movable contact 44 faces the fourth fixed contact 24 in the front-rear direction. The fourth movable contact 44 is contactable with the fourth fixed contact 24.

Figure 4:
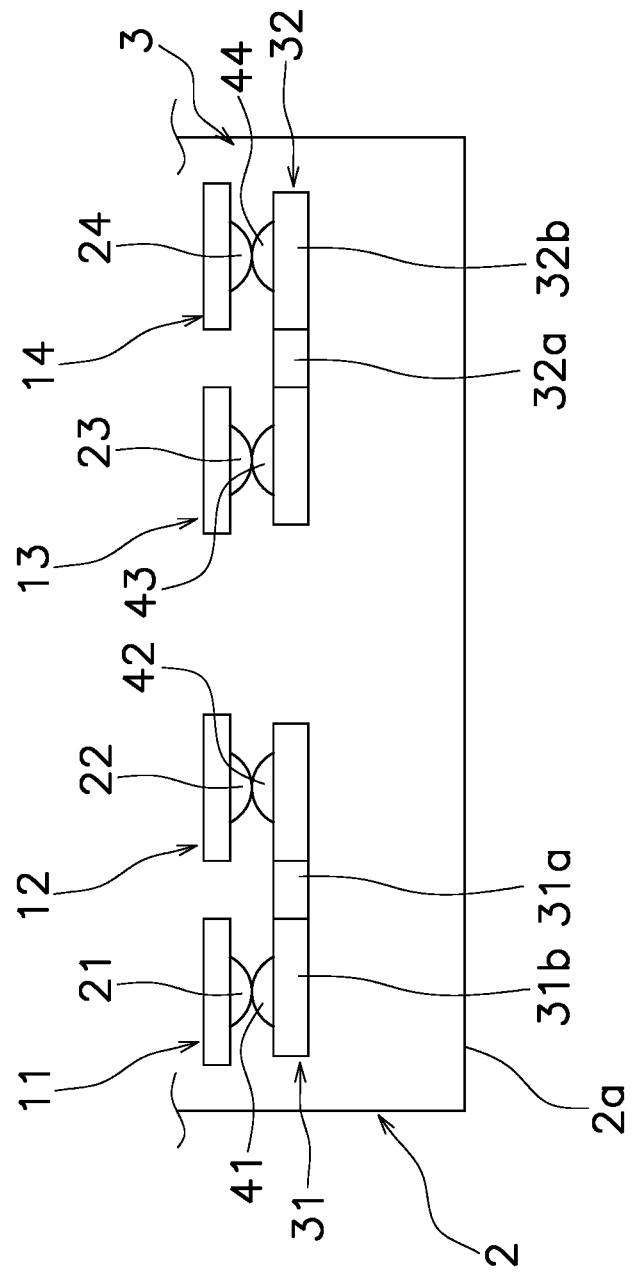
FIG. 4 is a schematic view of a contact device as viewed from above.

The drive device 4 moves the movable contact pieces 31 and 32 in the direction in which the first to fourth movable contacts 41 to 44 approach the first to fourth fixed contacts 21 to 24 and in the direction in which the first to fourth movable contacts 41 to 44 separate from the first to fourth fixed contacts 21 to 24. Specifically, the drive device 4 moves the movable contact pieces 31 and 32 to the open position shown in FIG. 3 and to the closed position shown in FIG. 4. When the movable contact pieces 31 and 32 are in the closed position, the first to fourth movable contacts 41 to 44 are in contact with the first to fourth fixed contacts 21 to 24, respectively. When the movable contact pieces 31 and 32 are in the open position, the first to fourth fixed contacts 21 to 24 and the first to fourth movable contacts 41 to 44 are separated from each other.

The drive device 4 has a conventional configuration, and includes a spool 51, a coil (not shown), a fixed iron core (not shown), a yoke 52, a movable iron piece 53, and a return spring 54. The spool 51 is cylindrical and extends in the front-rear direction. The coil is wound around the outer circumference of the spool 51. The fixed iron core is disposed inside the spool 51 and penetrates the spool 51 in the front-rear direction. The yoke 52 has an L-shaped bent shape. The yoke 52 includes a connecting portion 52a and an extending portion 52b. The connecting portion 52a is disposed behind the spool 51 and is connected to the fixed iron core. The extending portion 52b extends forward from the upper end of the connecting portion 52a to cover the upper portion of the coil.

The movable iron piece 53 is disposed in front of the fixed iron core. The movable iron piece 53 is rotatably supported by the yoke 52 at the front end of the extending portion 52b. The movable iron piece 53 is movable integrally with the movable contact pieces 31 and 32. Specifically, the movable iron piece 53 and the movable contact pieces 31 and 32 are made by insert-molding into a resin member 60 that insulates the movable iron piece 53 and the movable contact pieces 31 and 32. Thus, the movable contact pieces 31 and 32 and the resin member 60 rotate integrally with the movable iron piece 53 in response to the rotation of the movable iron piece 53.

The return spring 54 is a coil spring and extends in the front-rear direction. The return spring 54 is connected, at the front end, to the movable iron piece 53 and is, at the rear end, connected to the yoke 52. The return spring 54 forces the movable contact pieces 31 and 32 toward the open position via the movable iron piece 53 and the resin member 60. In other words, the return spring 54 forces the first to fourth movable contacts 41 to 44 in the direction in which the first to fourth movable contacts 41 to 44 separate from the first to fourth fixed contacts 21 to 24.

Figure 5:
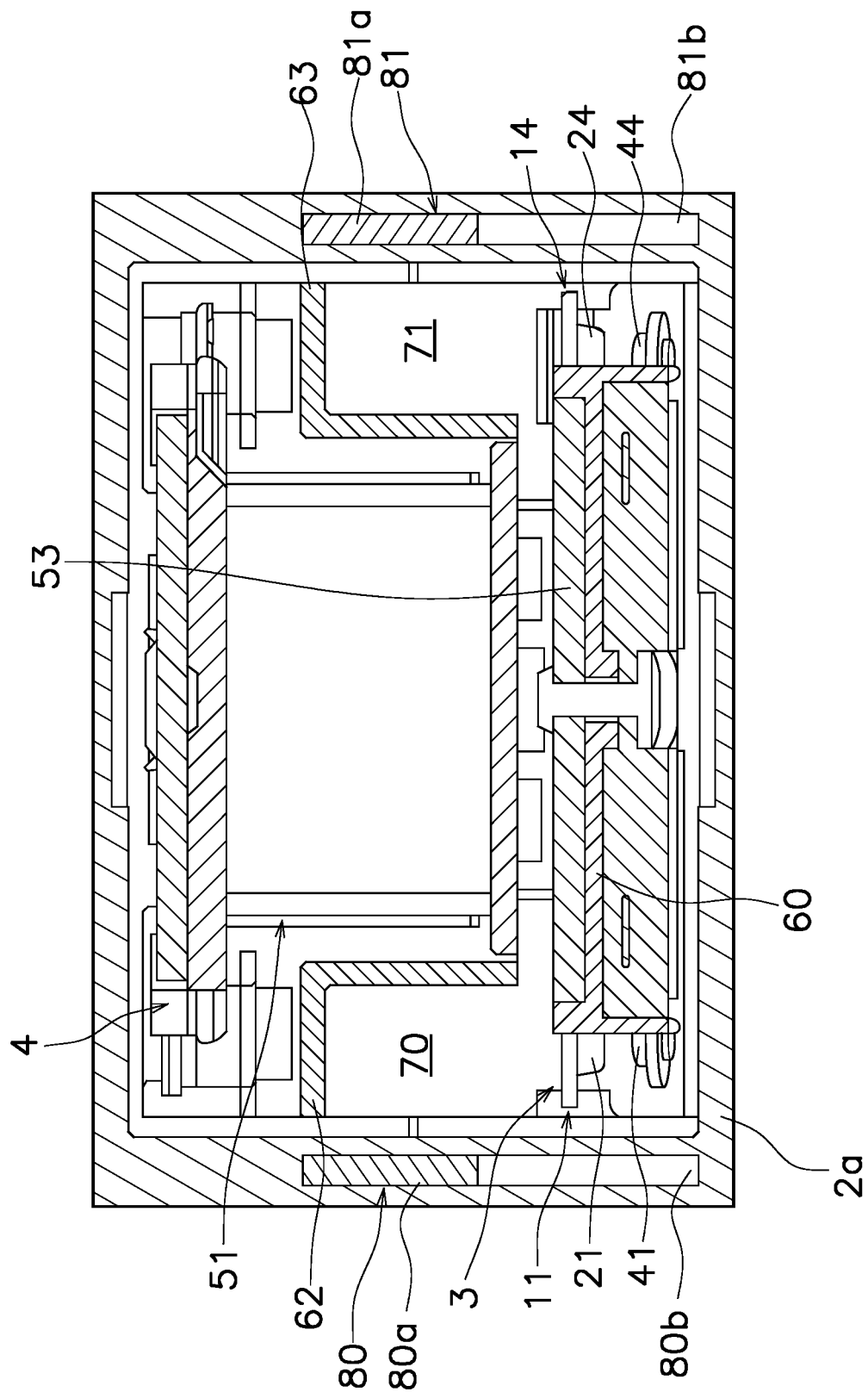
FIG. 5 is a cross-sectional view of an electromagnetic relay cut along a plane parallel to the base.

FIG. 5 is a cross-sectional view of the electromagnetic relay 1 that is cut along a plane parallel to the base 2a. The electromagnetic relay 1 includes arc extension spaces 70 and 71 and magnets 80 and 81. The arc extension spaces 70 and 71 are located between the base 2a and the case 2b. The arc extension spaces 70 and 71 are defined by the base 2a, the case 2b, and partitions 62 and 63 protruding upward from the base 2a. The partitions 62 and 63 each have a substantially L-shape as viewed from above. The partitions 62 and 63 are disposed on the left and right sides of the drive device 4, respectively. The partition 62 is disposed behind the first fixed terminal 11. The partition 63 is disposed behind the fourth fixed terminal 14. The arc extension space 70 is located between the first fixed terminal 11 and the partition 62.

The magnets 80 and 81 are, for example, plate-shaped permanent magnets. The magnets 80 and 81 are supported by the base 2a. The magnets 80 and 81 may be supported by the case 2b. The magnet 80 generates a magnetic field for extending an arc in the arc extension space 70 when the arc is generated between the first fixed contact 21 and the first movable contact 41. The magnet 80 is disposed to the right of the contact device 3 and the arc extension space 70. The magnet 80 is disposed with its N-pole facing the contact device 3 and the arc extension space 70. The magnet 81 has the same shape as the magnet 80. The magnet 81 is disposed to the left of the contact device 3 and the arc extension space 70. The magnet 81 is disposed with the N-pole facing the contact device 3 and arc extension space 71. The magnets 80 and 81 each has an inclined top portion so that the front end is lower than the rear end of the top. The magnets 80 and 81 are trapezoidal in shape as viewed from the left-right direction.

Figure 6:
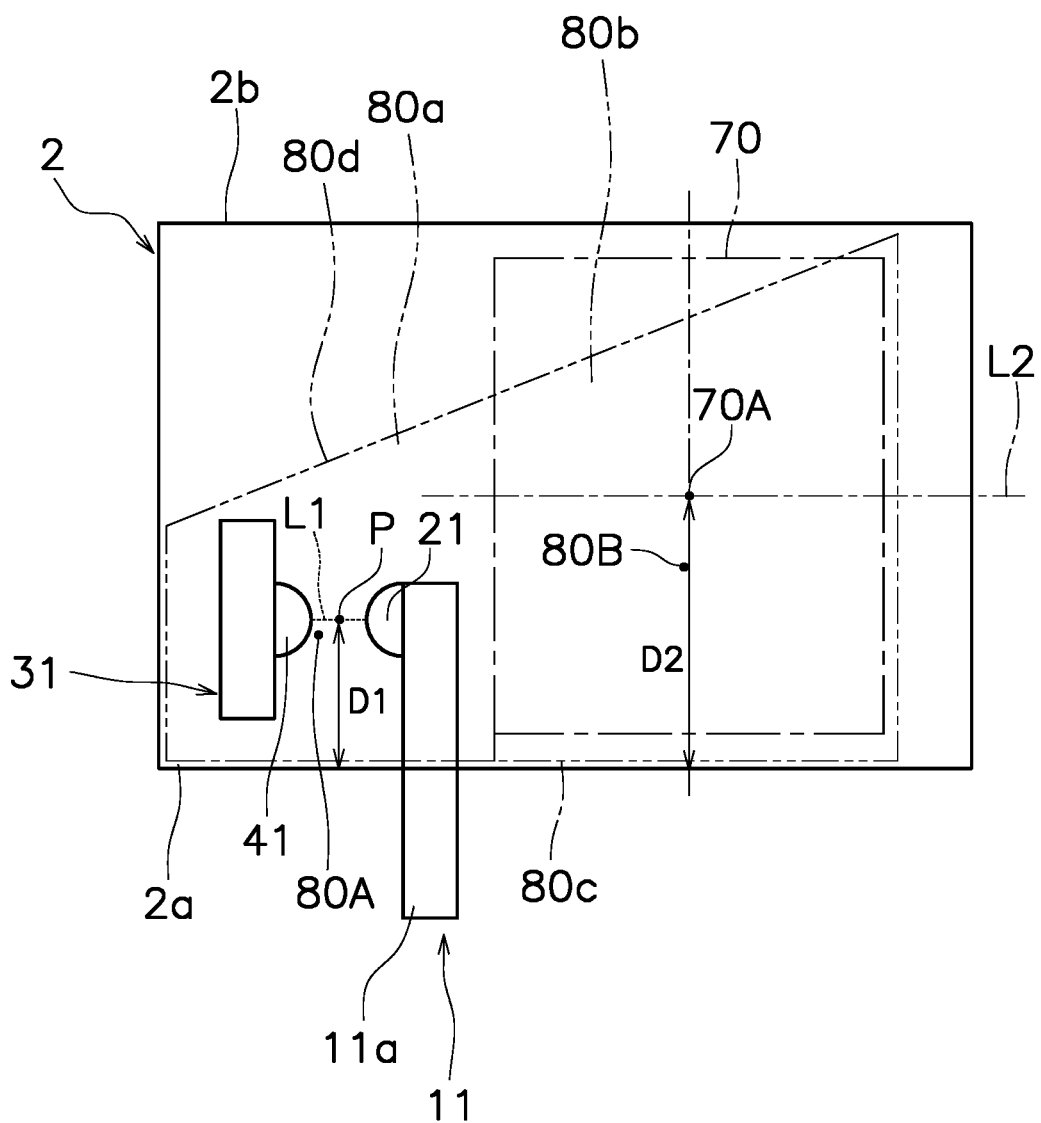
FIG. 6 is a schematic view to illustrate the arrangement of magnets.

FIG. 6 is a schematic diagram for illustrating the positional relationships of the first fixed contact 21, the first movable contact 41, the arc extension space 70 and the magnet 80. FIG. 6 is a schematic diagram of the area around the first fixed contact 21 viewed from the left of the electromagnetic relay 1. As shown in FIGS. 5 and 6, the magnet 80 includes a first magnet portion 80a and a second magnet portion 80b. The first magnet portion 80a faces the contact device 3. The first magnet portion 80a overlaps with the contact device 3 in the left-right direction. The first magnet portion 80a generates a magnetic field to guide an arc that is generated between the first fixed contact 21 and the first movable contact 41 toward the arc extension space 70. The magnet 80 includes a straight portion 80c and an inclined portion 80d. The straight portion 80c extends parallel to the base 2a as viewed from the left-right direction. The straight portion 80c constitutes the lower end of the magnet 80. The inclined portion 80d slopes, located apart from the straight portion 80c, apart from the base 2a as it approaches the arc extension space 70 from the contact device 3. The inclined portion 80d constitutes the upper end of the magnet 80.

The second magnet portion 80b is integral with the first magnet portion 80a and is adjacent to the first magnet portion 80a. The second magnet portion 80b is disposed behind the first magnet portion 80a. The second magnet portion 80b has a dimension, in the up-down direction, that is greater than the that of the first magnet portion 80a. The second magnet portion 80b protrudes upward from the first magnet portion 80a. Viewed from the left-right direction, the area of the second magnet portion 80b is greater than that of the first magnet portion 80a. The second magnet portion 80b faces the arc extension space 70. The second magnet portion 80b overlaps with the arc extension space 70 in the left-right direction. The second magnet portion 80b generates a magnetic field to extend an arc that is guided toward the arc extension space 70 into the arc extension space 70.

As shown in FIG. 6, the distance D1 from the midpoint P of the line L1 between the first fixed contact 21 and the first movable contact 41 to the base 2a is different from the distance D2 from the center 70A of the arc extension space 70 to the base 2a. In this embodiment, the distance D1 is smaller than the distance D2. In other words, the midpoint P of the line L1 is closer to the base 2a than the center 70A of the arc extension space 70. The straight line L1 is closer to the base 2a than the straight line L2 crossing the center 70A of the arc extension space 70 and extending parallel to the base 2a. The center 80A of the first magnet portion 80a is closer to the base 2a than the center 80B of the second magnet portion 80b. The center 70A of the arc extension space 70 is farther from the base 2a than the first fixed terminal 11.

Figure 7:
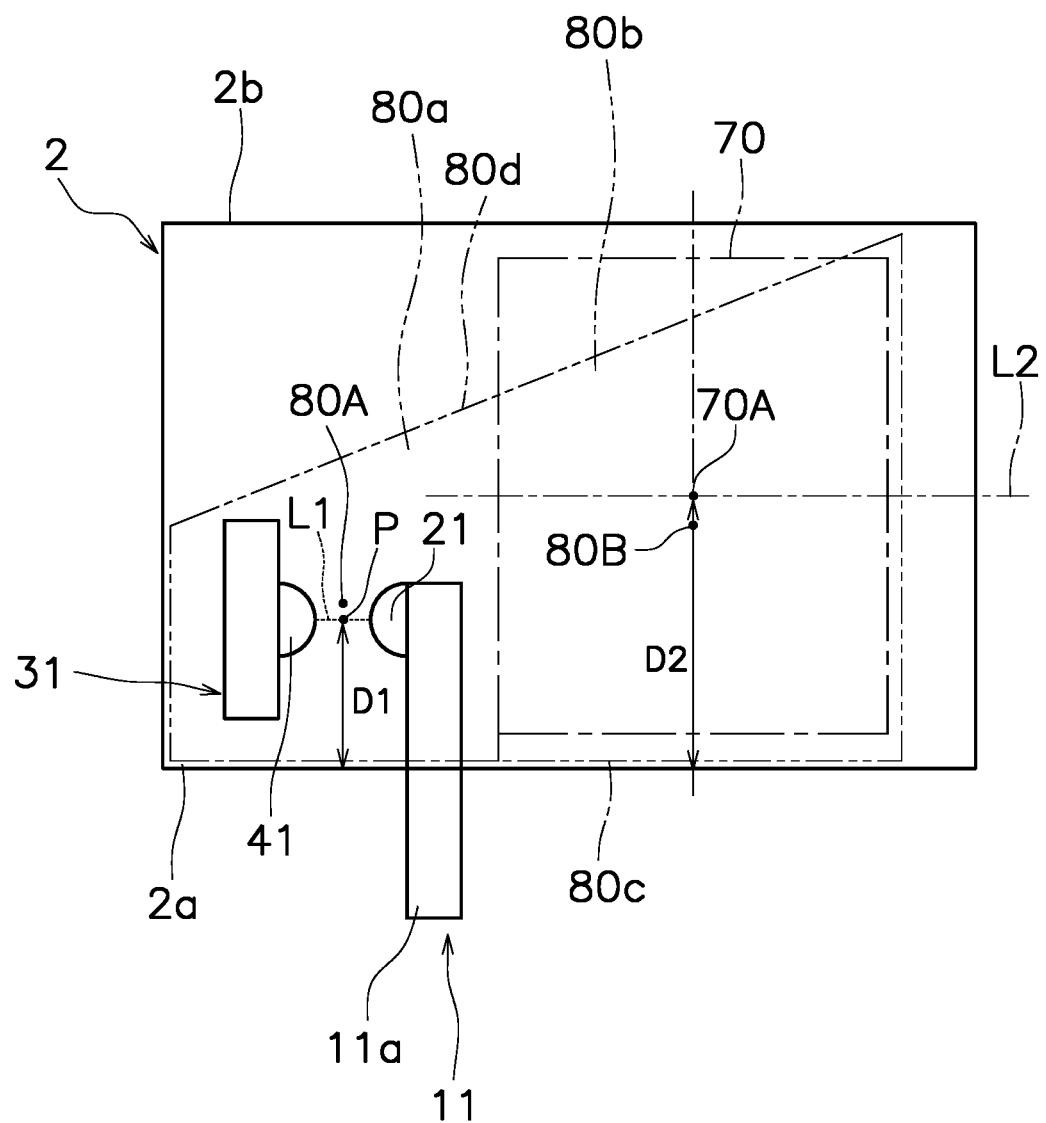
FIG. 7 is a schematic view to illustrate the arrangement of magnets.

When the first movable contact piece 31 is in the closed position and the first fixed contact 21 is in contact with the first movable contact 41, the contact point between the first fixed contact 21 and the first movable contact 41 corresponds to the midpoint P of the straight line L1. In FIG. 6, the position of the center of gravity of the first magnet portion 80a is illustrated as the center 80A of the first magnet portion 80a, and the position of the center of gravity of the second magnet portion 80b is illustrated as the center 80B of the second magnet portion 80b. However, the center 80A of the first magnet portion 80a may be the center of a cross-section of the first magnet portion 80a cut along a plane crossing the midpoint P of the straight line L and parallel to the up-down and left-right directions. Similarly, the center 80B of the second magnet portion 80b may be the center of a cross-section of the second magnet portion 80b cut along a plane crossing the center 70A of the arc extension space 70 and parallel to the up-down and left-right directions. In these cases, the center 80A of the first magnet portion 80a and the center 80B of the second magnet portion 80b are the positions shown in FIG. 7, respectively.

The positional relationships between the fourth fixed contact 24, the fourth movable contact 44, the arc extension space 71, and the magnet 81 is the same as those between the first fixed contact 21, the first movable contact 41, the arc extension space 70, and the magnet 80. Therefore, the description thereof will be omitted.

Next, the operation of the electromagnetic relay 1 will be described. When no voltage is applied to the coil, the movable contact pieces 31 and 32 are in the open position due to the elastic force of the return spring 54, and the first to fourth movable contacts 41 to 44 are separated from the first to fourth fixed contacts 21 to 24, respectively. When a voltage is applied to the coil and the coil is excited, the movable iron piece 53 is attracted to the fixed iron core by the electromagnetic force, and the movable iron piece 53 rotates against the elastic force of the return spring 54. As a result, the movable contact pieces 31 and 32 each move from the open position to the closed position, and the first to fourth movable contacts 41 to 44 come into contact with the first to fourth fixed contacts 21 to 24, respectively. When the application of the voltage to the coil is stopped, the movable iron piece 53 is rotated by the elastic force of the return spring 54, and the movable contact pieces 31 and 32 each move to the open position.

For example, when the first movable contact piece 31 moves from the closed position to the open position and the first movable contact 41 is released from the state of being in contact with the first fixed contact 21, an arc is generated between the first movable contact 41 and the first fixed contact 21.

In the electromagnetic relay 1 described above, the distance D1 from the midpoint P of the straight line L1 between the first fixed contact 21 and the first movable contact 41 to the base 2a is different from the distance D2 from the center 70A of the arc extension space 70 to the base 2a. Also, the distance from the center 80A of the first magnet portion 80a to the base 2a is different from the distance from the center 80B of the second magnet portion 80b to the base 2a. Thus, for example, a configuration is possible in which the first magnet portion 80a is disposed so that the center 80A of the first magnet portion 80a is located near the midpoint P of the straight line L1 and in which the second magnet portion 80b is disposed so that the center 80B of the second magnet portion 80b is located near the center 70A of the arc extension space 70. This configuration allows the magnetic flux of the first magnet portion 80a to flow, near the contact point, in a direction substantially parallel to the left-right direction. Also, the configuration allows the magnetic flux of the second magnet portion 80b to flow, near the center 70A of the arc extension space 70, in a direction substantially parallel to the left-right direction. As a result, controlling of the extension direction of an arc that is generated between the contact of the first movable contact 41 and the first fixed contact 21 is facilitated, and thereby the arc can be easily guided to the arc extension space 70 and can be effectively extended in the arc extension space 70.

Specifically, an arc generated between the first fixed contact 21 and the first movable contact 41 is extended upward by the first magnet portion 80a and then extended diagonally backward toward the arc extension space 70. In the arc extension space 70, the magnetic flux of the second magnet portion 80b further extends the arc upward. Note that an arc generated between the fourth fixed contact 24 and the fourth movable contact 44 is guided to the arc extension space 71 by the first magnet portion 81a and is extended effectively in the arc extension space 71 by the second magnet portion 81b.

One embodiment of the present invention has been described above. However, the present invention is not limited to the above embodiment, and various modifications can be made without departing from the gist of the invention.

In the above embodiment, the arc extension spaces 70 and 71 are defined by the base 2a, the case 2b, and the partitions 62 and 63, but the arc extension spaces 70 and 71 may be defined by other members. Further, the members defining the arc extension spaces 70 and 71 do not necessarily have to be made of resin and may be ceramic or metal.

In the above embodiment, the electromagnetic relay 1 includes a plurality of fixed contacts 21 to 24 and a plurality of movable contacts 41 to 44, but the present invention is applicable to an electromagnetic relay having a single fixed contact and a single movable contact.

In the above embodiment, the magnets 80 and 81 are permanent magnets, but the magnets 80 and 81 may be plastic magnets. Alternatively, yokes can be combined to form the magnets 80 and 81.

Figure 8:
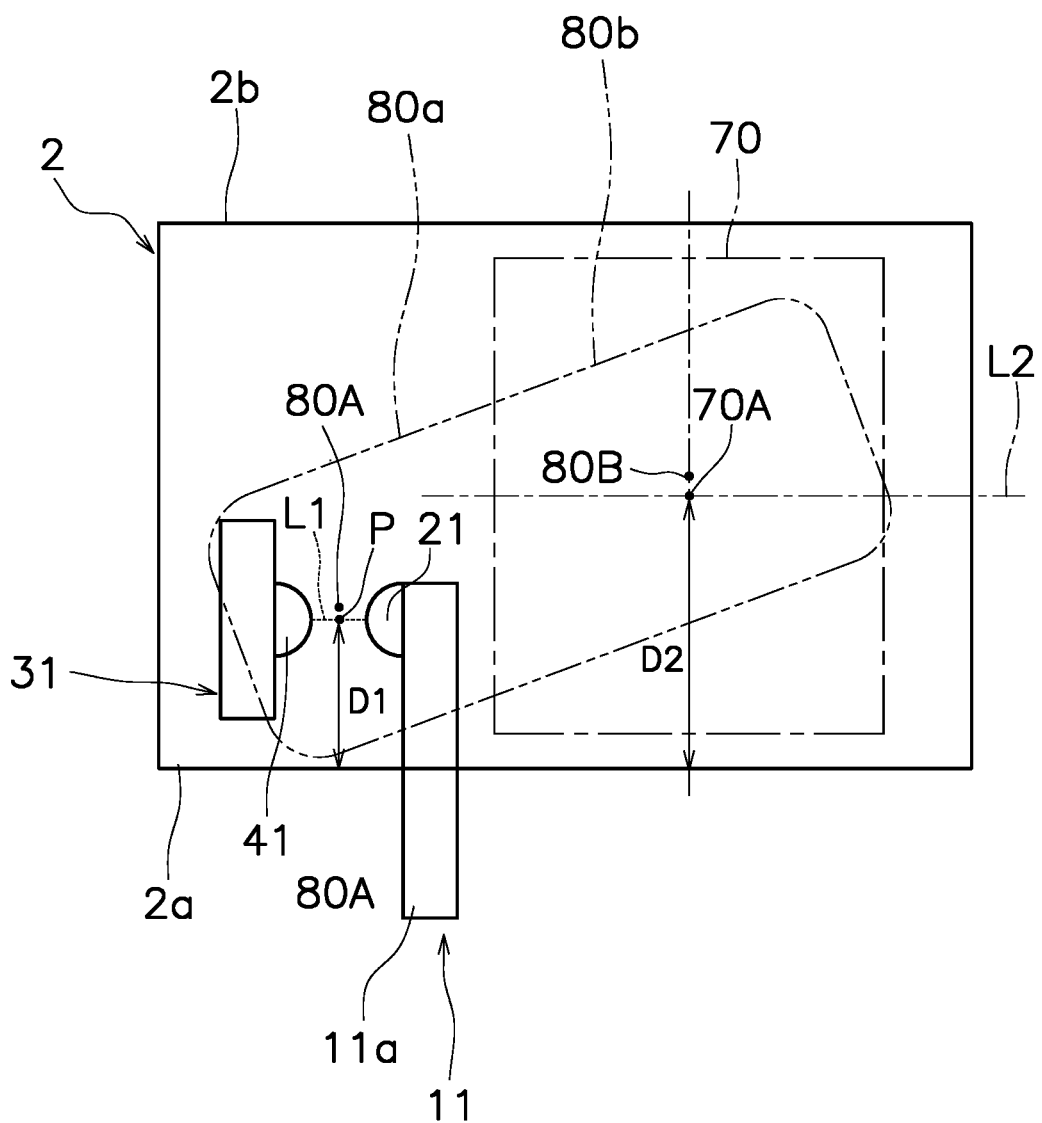
FIG. 8 is a schematic view to illustrate the arrangement of magnets according to another embodiment.
Figure 9:
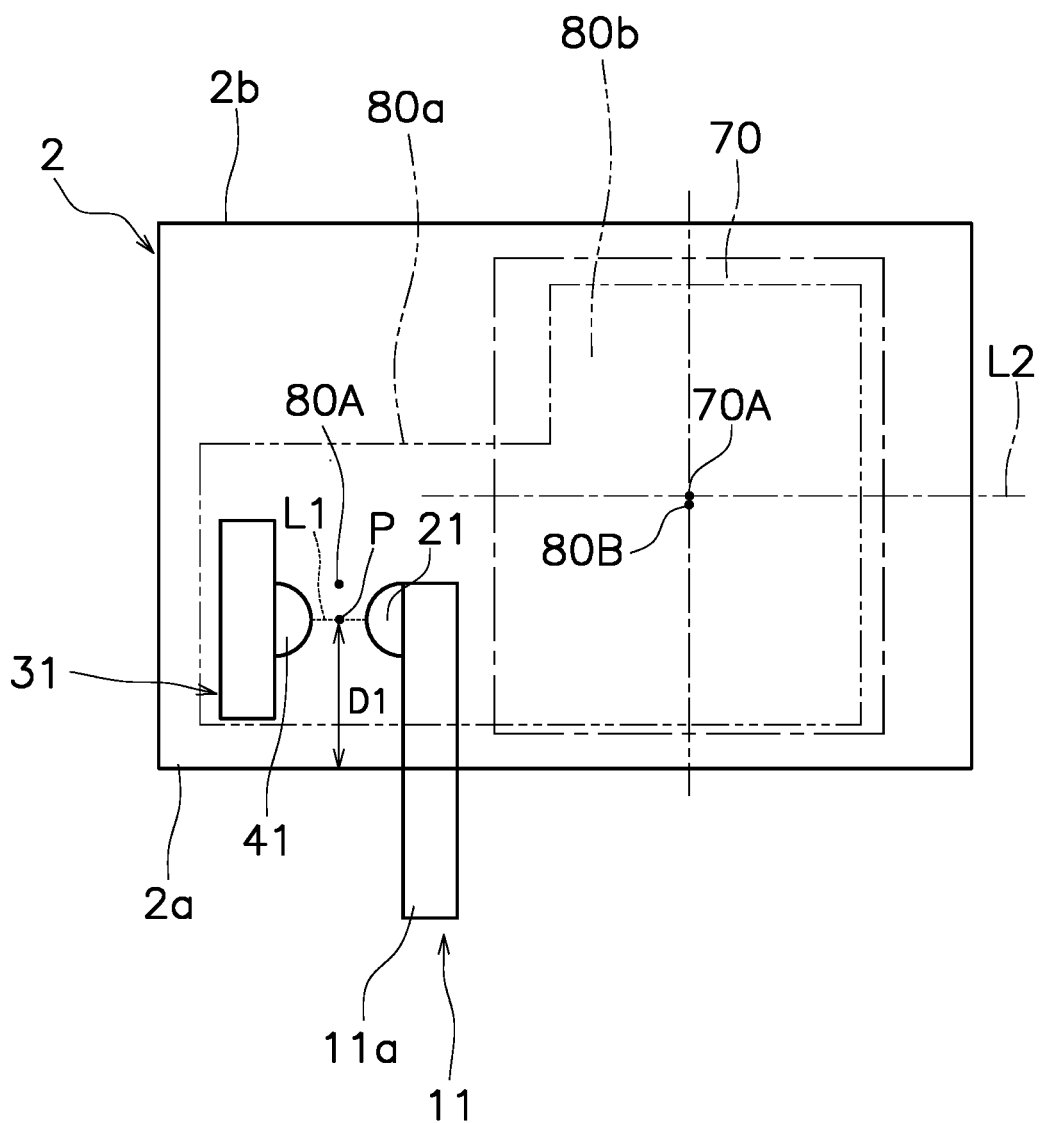
FIG. 9 is a schematic view to illustrate the arrangement of magnets according to another embodiment.

As shown in FIGS. 8 to 12, the shapes of the magnets 80 and 81 may be changed. For example, as shown in FIG. 8, the magnets 80 and 81 may be disposed so as to be inclined with respect to the base 2a as viewed from the left-right direction. Note that the center 80A of the first magnet portion 80a in FIGS. 8 to 12 illustrates the center of a cross section of the first magnet portion 80a cut along a plane crossing the midpoint P of the straight line L and parallel to the up-down and left-right directions. Also, the center 80B of the second magnet portion 80b in FIGS. 8 to 11 illustrates the center of a cross-section of the second magnet portion 80b cut along a plane crossing the center 70A of the arc extension space 70 and parallel to the up-down and left-right directions.

Figure 10:
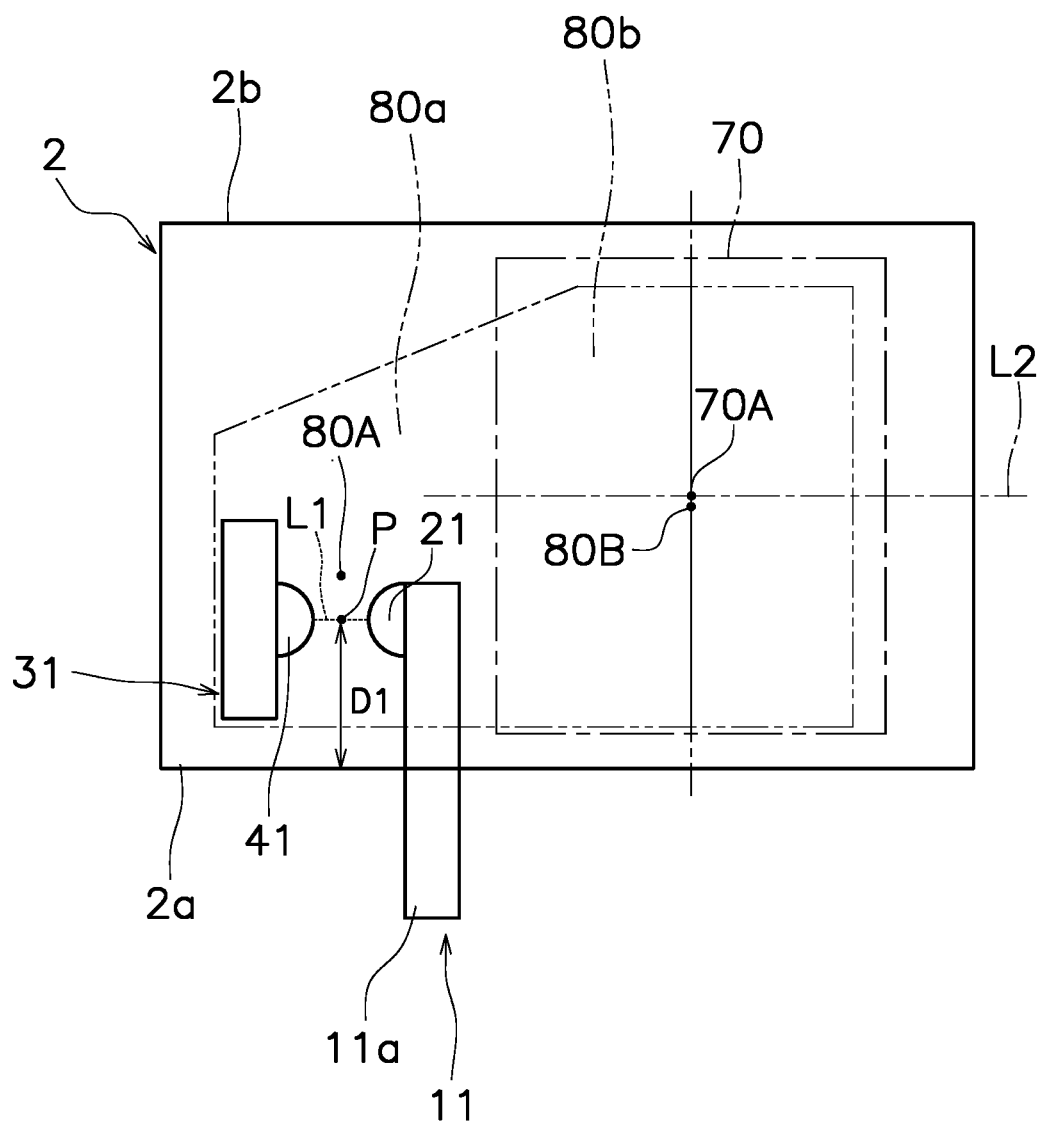
FIG. 10 is a schematic view to illustrate the arrangement of magnets according to another embodiment.
Figure 11:
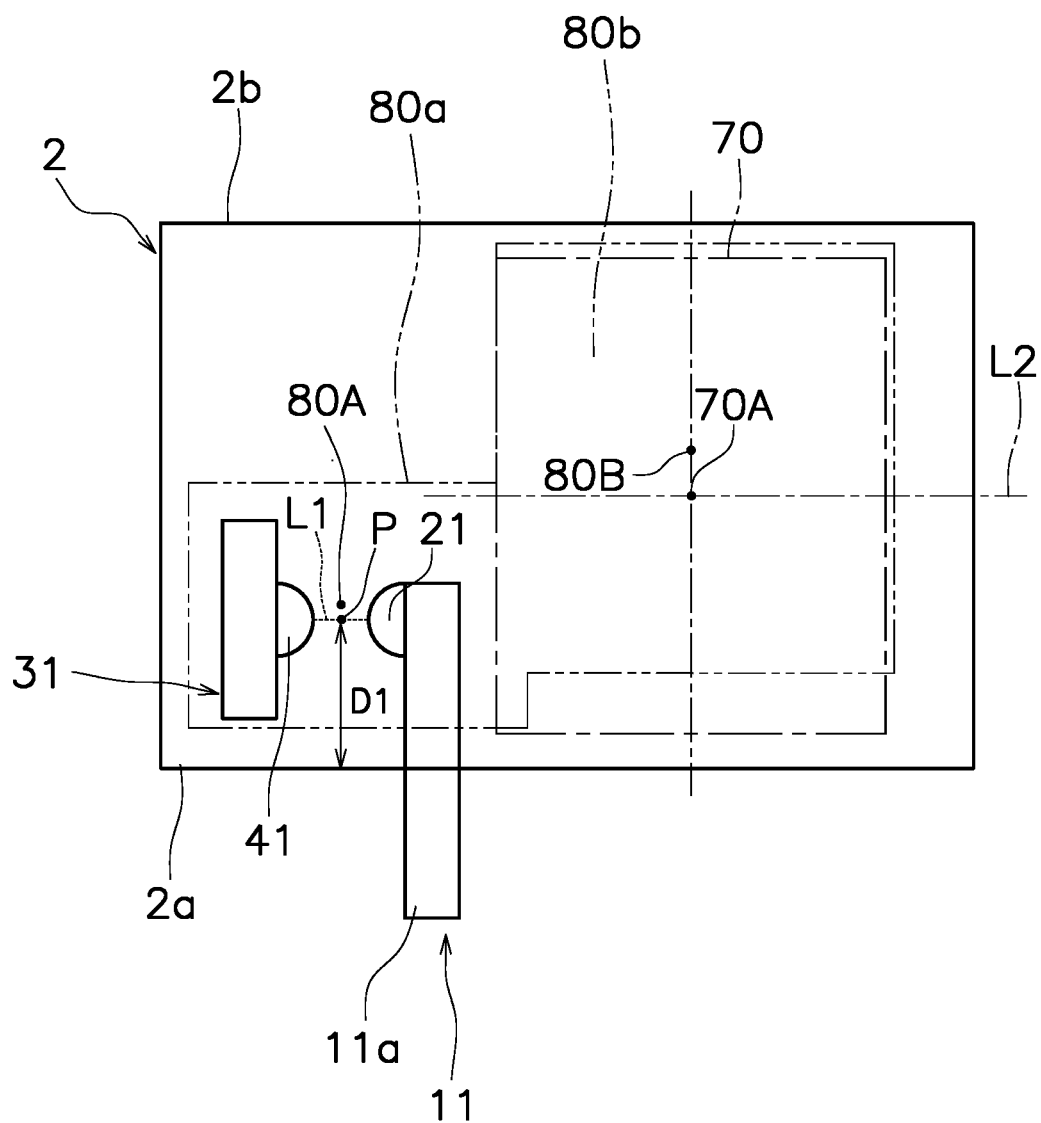
FIG. 11 is a schematic view to illustrate the arrangement of magnets according to another embodiment.
Figure 12:
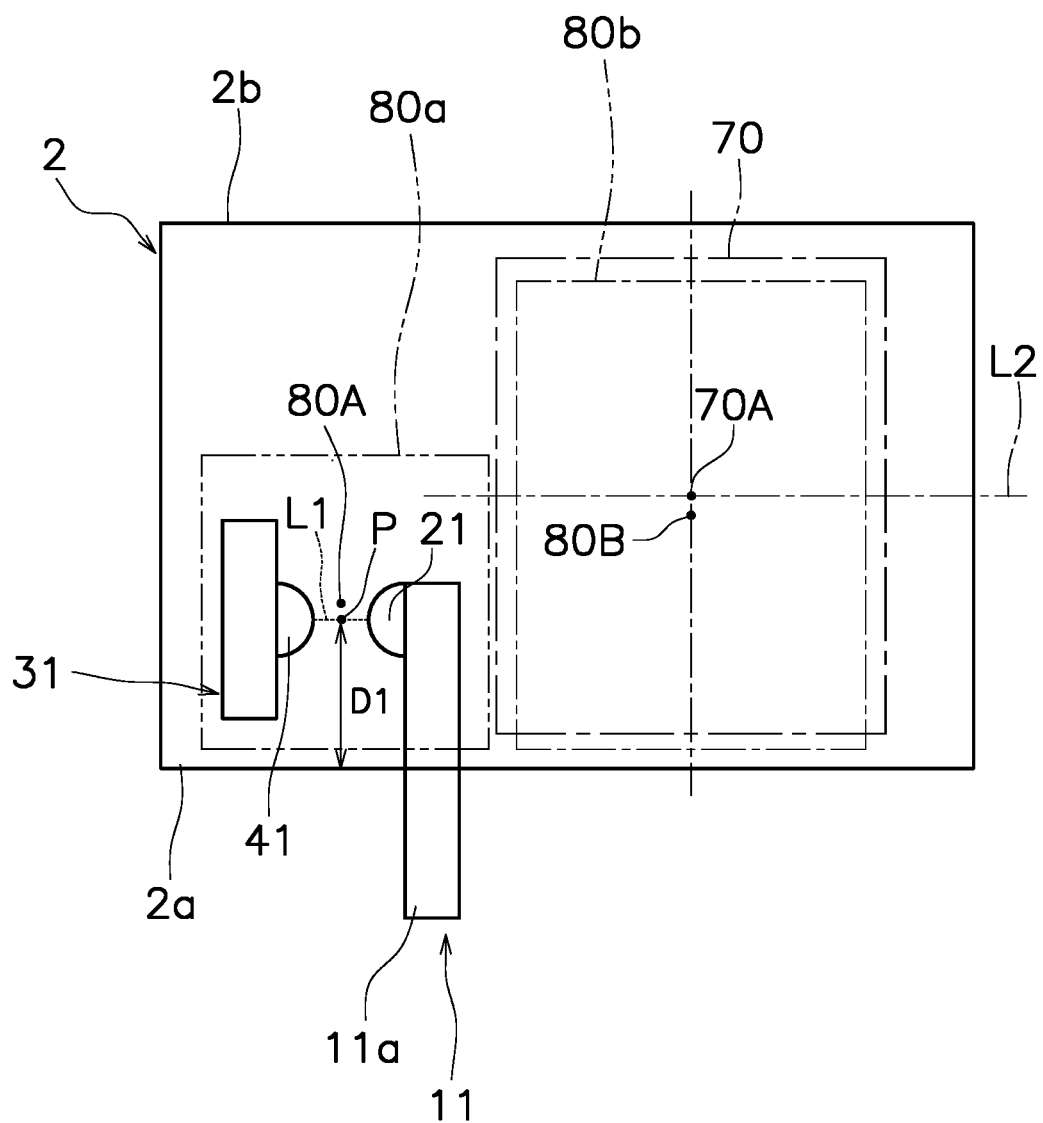
FIG. 12 is a schematic view to illustrate the arrangement of magnets according to another embodiment.

As shown in FIGS. 10 to 12, the magnets 80 and 81 may be polygonal in shape as viewed from the left-right direction. Specifically, as shown in FIG. 10, the first magnet portion 80a and the second magnet portion 80b may be rectangular in shape. As shown in FIG. 11, the upper portion of the second magnet portion 80b may include a straight portion and an inclined portion. As shown in FIG. 12, the lower end of the first magnet portion 80a and the lower end of the second magnet portion 80b may be positioned at different distances from the base 2a. Further, the second magnet portion 80b may protrude beyond the arc extension space 70 as viewed from the left-right direction.

In the above embodiment, the center 80A of the first magnet portion 80a is located near the midpoint P of the straight line L1, but the first magnet portion 80a may be disposed so that the center 80A of the first magnet portion 80a overlaps with the midpoint P of the straight line L1 as viewed from the left-right direction. The second magnet portion 80b may be disposed so that the center 80B of the second magnet portion 80b overlaps with the center 70A of the arc extension space 70 as viewed from the left-right direction.

In the embodiment, the first magnet portion 80a and the second magnet portion 80b are an integrated body, but as shown in FIG. 12, the first magnet portion 80a and the second magnet portion 80b may be separate bodies. That is, the magnet 80 may be composed of a plurality of separate magnets.

REFERENCE NUMERALS

1 Electromagnetic relay
2 Housing
2a Base
2b Case
11 First fixed terminal
21 First fixed contact
31 First movable contact piece
41 First movable contact
70 Arc extension space
80 Magnet
80a First magnet portion
80b Second magnet portion
80c Straight portion
80d Inclined portion

The invention claimed is:

1. An electromagnetic relay, comprising:
a housing including a base and a case attached to the base;
a first arc extension space formed between the base and the case;
a first contact device including a first fixed terminal extending from the base in a first direction orthogonal to the base, a first fixed contact connected to the first fixed terminal, a first movable contact piece, and a first movable contact connected to the first movable contact piece, the first movable contact facing the first fixed contact; and
a first permanent magnet including a first magnet portion and a second magnet portion, the first magnet portion having a first pole facing the first contact device, the second magnet portion disposed adjacent to the first magnet portion and having a second pole of the same pole type as the first pole of the first magnet portion, the second pole facing the first arc extension space, the first permanent magnet facing the first contact device and the first arc extension space in a second direction, the second direction intersecting the first direction and a direction from the first movable contact to the first fixed contact, the first permanent magnet configured and arranged to generate a magnetic field to extend that causes an arc generated between the first fixed contact and the first movable contact to extend toward the first arc extension space,
the base being separated from a midpoint of a straight line between the fixed contact and the movable contact by a distance different from a distance between the base and a center of the arc extension space, and
the base being separated from a center of the first magnet portion by a distance different from a distance between the base and a center of the second magnet portion.

2. The electromagnetic relay according to claim 1, wherein the midpoint is closer to the base than the center of the first arc extension space, and
the center of the first magnet portion is closer to the base than the center of the second magnet portion.

3. The electromagnetic relay according to claim 2, wherein the center of the first arc extension space is farther from the base than the first fixed terminal.

4. The electromagnetic relay according to claim 1, wherein the first permanent magnet further includes a straight portion and an inclined portion as viewed from the second direction, the straight portion extending parallel to the base, the inclined portion located apart from the straight portion and inclining in a direction away from the base as the inclined portion approaches the arc extension space from the first contact device.

5. The electromagnetic relay according to claim 1, wherein the first permanent magnet is inclined relative to the base as viewed from the second direction.

6. The electromagnetic relay according to claim 1, wherein the first permanent magnet has a polygonal shape as viewed from the second direction.

7. The electromagnetic relay according to claim 1, wherein the first magnet portion is a separate body from the second magnet portion.

8. The electromagnetic relay according to claim 1, wherein the second magnet portion has an area greater than an area of the first magnet portion as viewed from the second direction.

9. The electromagnetic relay according to claim 1, wherein the center of the first magnet portion is a center of gravity of the first magnet portion, or a center of a cross section of the first magnet portion cut along a plane crossing the midpoint and parallel to the first and second directions, and
the center of the second magnet portion is a center of gravity of the second magnet portion, or a center of a cross section of the second magnet portion cut along a plane crossing the center of the arc extension space and parallel to the first and second directions.

10. The electromagnetic relay according to claim 1, wherein the second magnet portion has a dimension in the first direction, the dimension being greater than a dimension of the first magnet portion in the first direction.

11. The electromagnetic relay according to claim 1, wherein the first permanent magnet is a plastic magnet.

12. The electromagnetic relay according to claim 1, further comprising
a second arc extension space formed between the base and the case;
a second contact device disposed apart from the first contact device in the second direction, the second contact device including a second fixed terminal extending from the base in the first direction, a second fixed contact connected to the second fixed terminal, a second movable contact piece, and a second movable contact connected to the second movable contact piece, the second movable contact facing the second fixed contact; and
a second permanent magnet including a third magnet portion and a fourth magnet portion, the third magnet portion having a third pole facing the second contact device, the fourth magnet portion disposed adjacent to the third magnet portion and having a fourth pole of the same pole type as the third pole of the third magnet portion, the fourth pole facing the second arc extension space, the second permanent magnet facing the second contact device and the second arc extension space in the second direction, the second permanent magnet configured and arranged to generate a magnetic field that causes an arc generated between the second fixed contact and the second movable contact to extend toward the second arc extension space.

13. The electromagnetic relay according to claim 12, wherein the first contact device and the second contact device are disposed between the first permanent magnet and the second permanent magnet, and
the third pole of the third magnet portion is of the same pole type as the first pole of the first magnet portion.

14. The electromagnetic relay according to claim 12, wherein the first pole of the first magnet portion and the third pole of the third magnet portion are both north poles.

15. An electromagnetic relay, comprising:
a housing including a base and a case attached to the base;
a first arc extension space formed between the base and the case;
a first contact device including a first fixed terminal extending from the base in a first direction, a first fixed contact connected to the first fixed terminal, a second fixed terminal extending from the base in the first direction, a second fixed contact connected to the second fixed terminal, a first movable contact piece including an extending portion extending in a second direction intersecting the first direction, a first movable contact connected to the extending portion of the first movable contact piece, and a second movable contact connected to the extending portion of the first movable contact piece, the first movable contact facing the first fixed contact in a third direction intersecting the first and second directions, the second movable contact facing the second fixed contact in the third direction; and
a first magnet including a first magnet portion and a second magnet portion, the first magnet portion having a first pole facing the first contact device, the second magnet portion disposed adjacent to the first magnet portion and having a second pole of the same pole type as the first pole of the first magnet portion, the second pole facing the first arc extension space, the first magnet facing the first contact device and the first arc extension space in the second direction, the first magnet configured and arranged to generate a magnetic field that causes an arc generated between the first fixed contact and the first movable contact to extend toward the first arc extension space,
the base being separated from a midpoint of a straight line between the fixed contact and the movable contact by a distance different from a distance between the base and a center of the arc extension space, and
the base being separated from a center of the first magnet portion by a distance different from a distance between the base and a center of the second magnet portion.

16. The electromagnetic relay according to claim 15, further comprising
a second arc extension space formed between the base and the case;
a second contact device disposed apart from the first contact device in the second direction, the second contact device including a third fixed terminal extending from the base in the first direction, a third fixed contact connected to the third fixed terminal, a fourth fixed terminal extending from the base in the first direction, a fourth fixed contact connected to the fourth fixed terminal, a second movable contact piece extending in the second direction, a third movable contact connected to the second movable contact piece, and a fourth movable contact connected to the second movable contact piece, the third movable contact facing the third fixed contact in the third direction, the fourth movable contact facing the fourth fixed contact in the third direction; and
a second magnet including a third magnet portion and a fourth magnet portion, the third magnet portion having a third pole facing the second contact device, the fourth magnet portion disposed adjacent to the third magnet portion and having a fourth pole of the same pole type as the third pole of the third magnet portion, the fourth pole facing the second arc extension space, the second magnet facing the second contact device and the second arc extension space in the second direction, the second magnet configured and arranged to generate a magnetic field that causes an arc generated between the third fixed contact and the second movable contact to extend toward the second arc extension space.

17. The electromagnetic relay according to claim 16, wherein the first contact device and the second contact device are disposed between the first magnet and the second magnet, and
the third pole of the third magnet portion is of the same pole type as the first pole of the first magnet portion.

18. The electromagnetic relay according to claim 16, wherein the first pole of the first magnet portion and the third pole of the third magnet portion are both north poles.

19. The electromagnetic relay according to claim 15, wherein the midpoint is closer to the base than the center of the first arc extension space, and
the center of the first magnet portion is closer to the base than the center of the second magnet portion.

20. The electromagnetic relay according to claim 15, wherein the first magnet further includes a straight portion and an inclined portion as viewed from the second direction, the straight portion extending parallel to the base, the inclined portion located apart from the straight portion and inclining in a direction away from the base as the inclined portion approaches the arc extension space from the first contact device.

* * * * *